Feb. 28, 1928.
S. B. WINN
1,660,946
COUPLING
Filed March 13, 1926
6 Sheets-Sheet 1
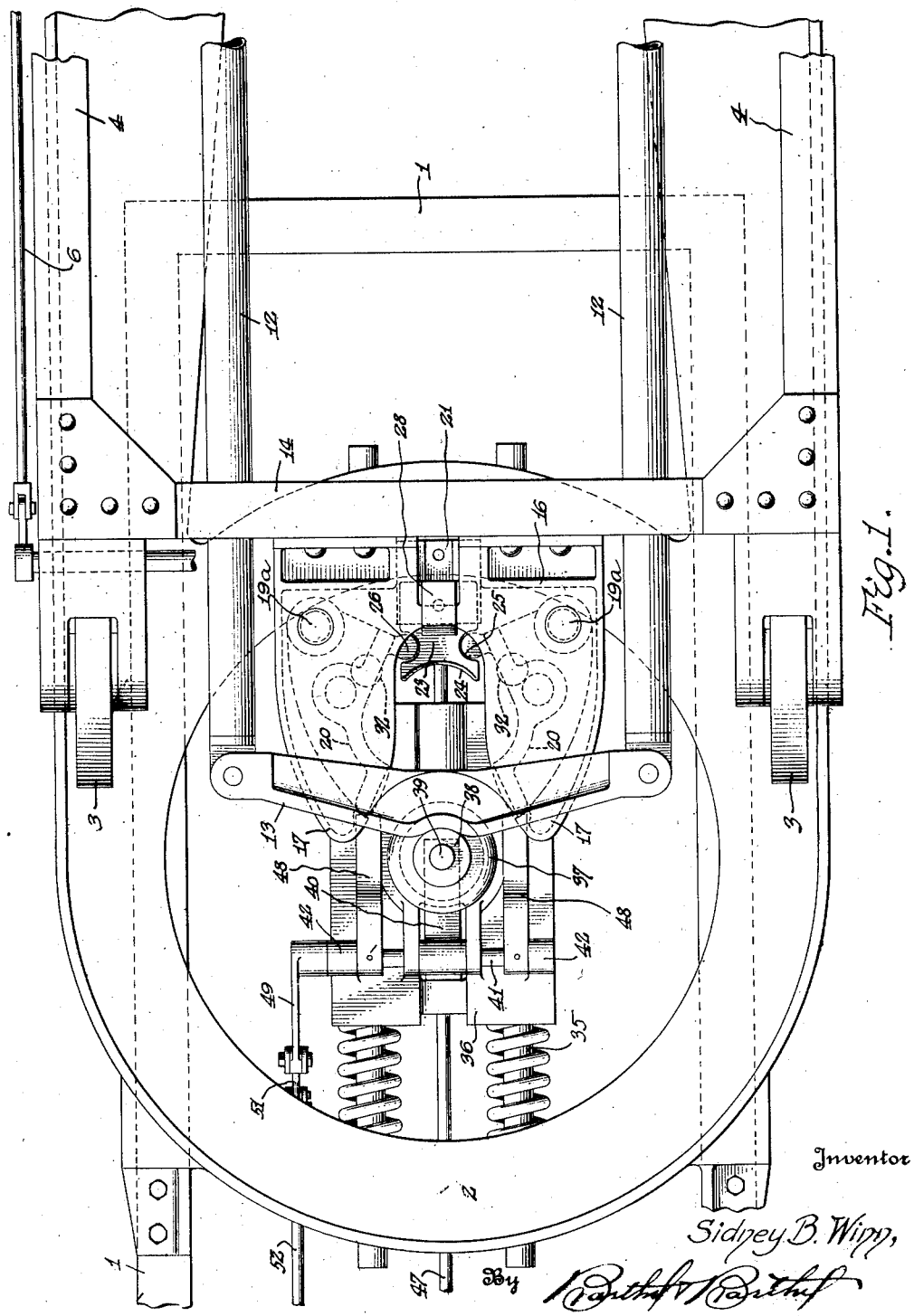
Inventor
Sidney B. Winn,
By
Attorneys

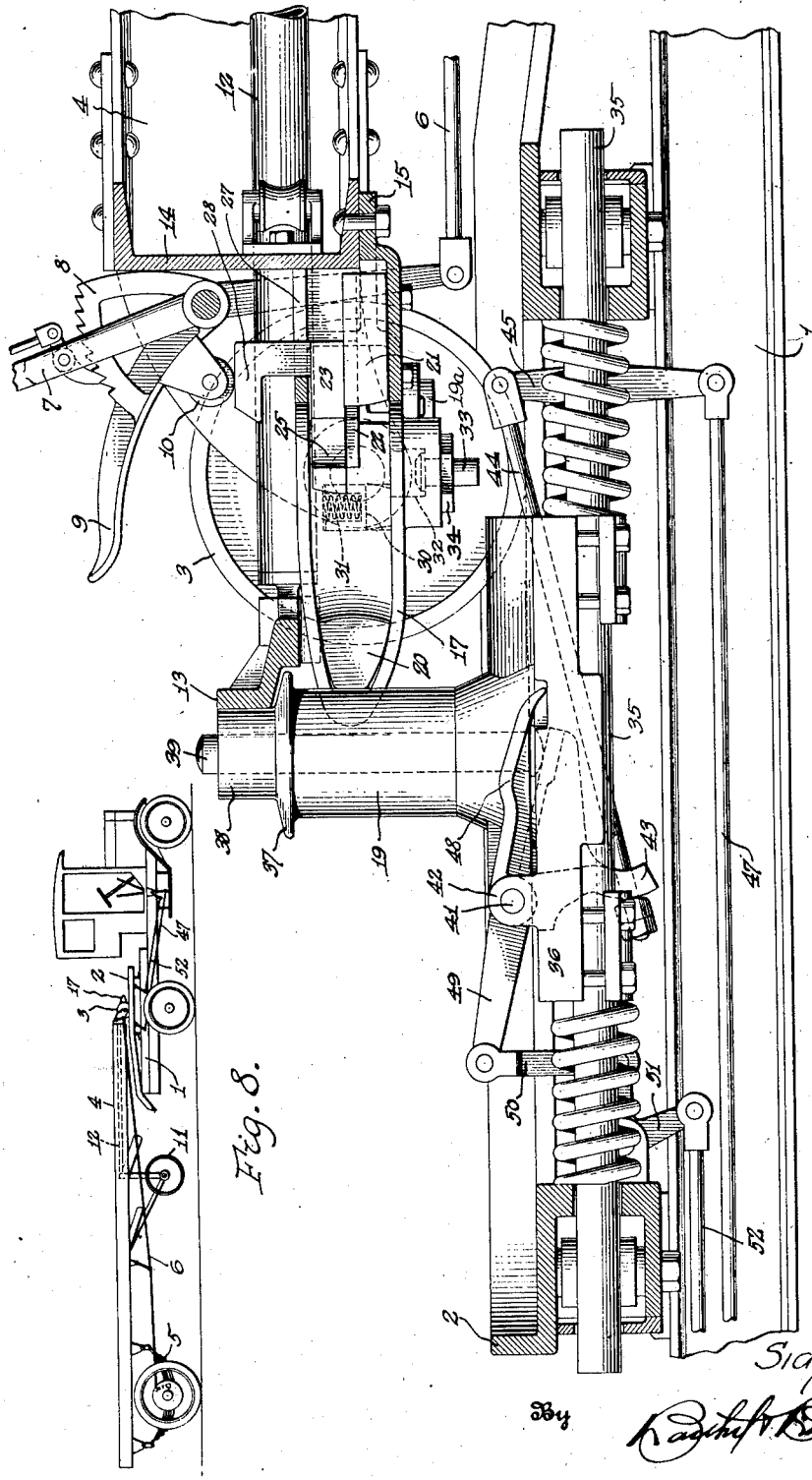

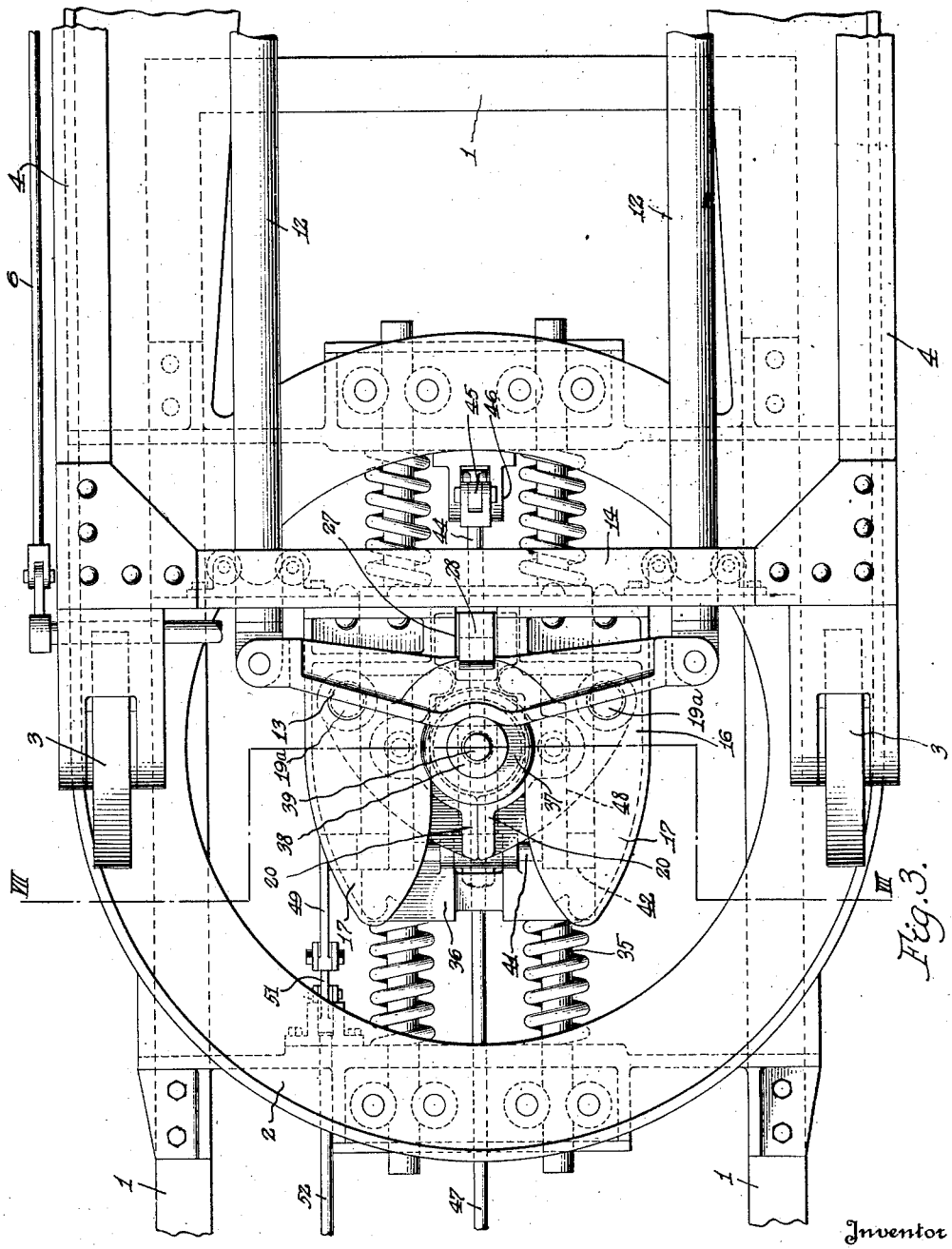

Feb. 28, 1928. 1,660,946
S. B. WINN
COUPLING
Filed March 13, 1926 6 Sheets-Sheet 4
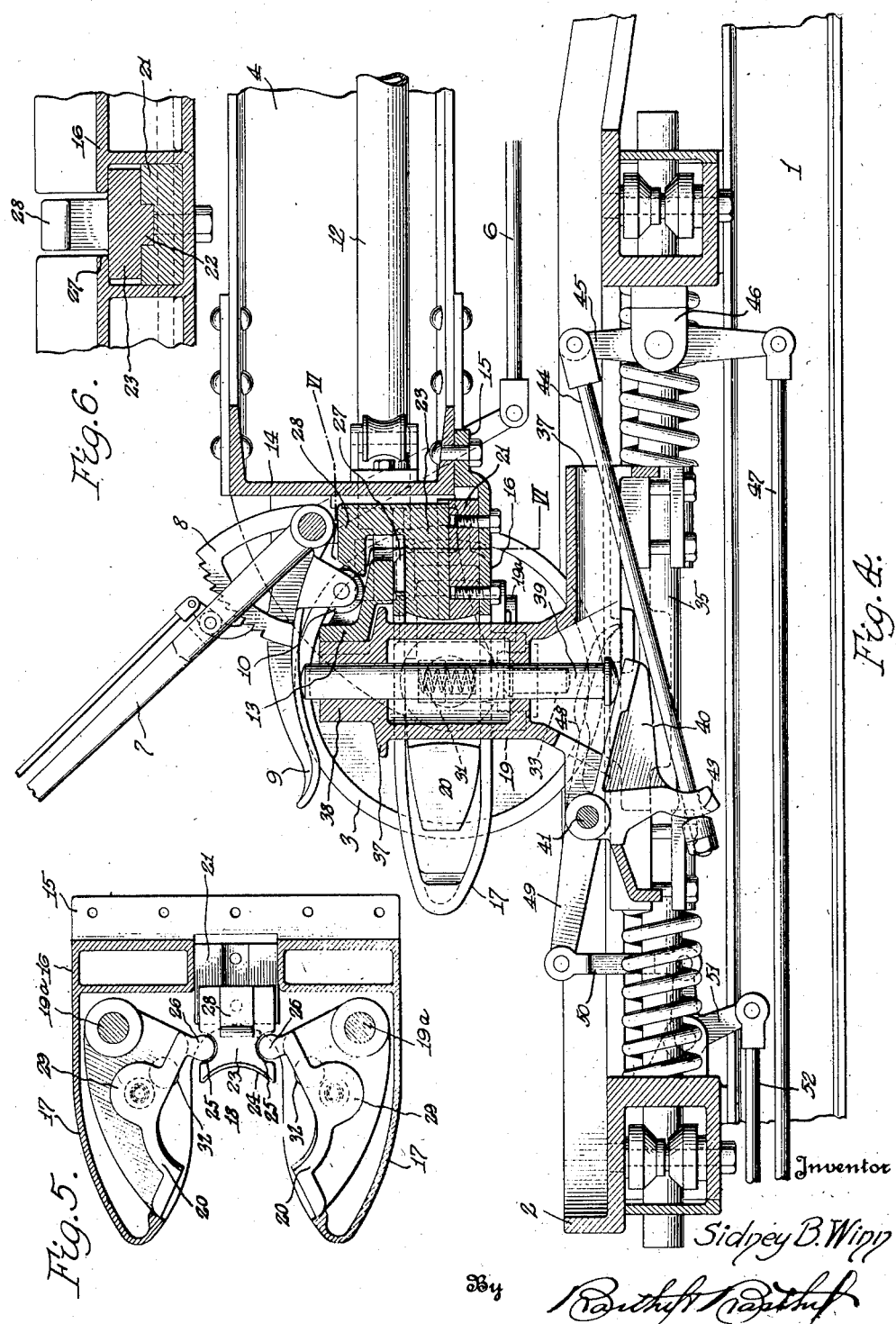
Inventor
Sidney B. Winn

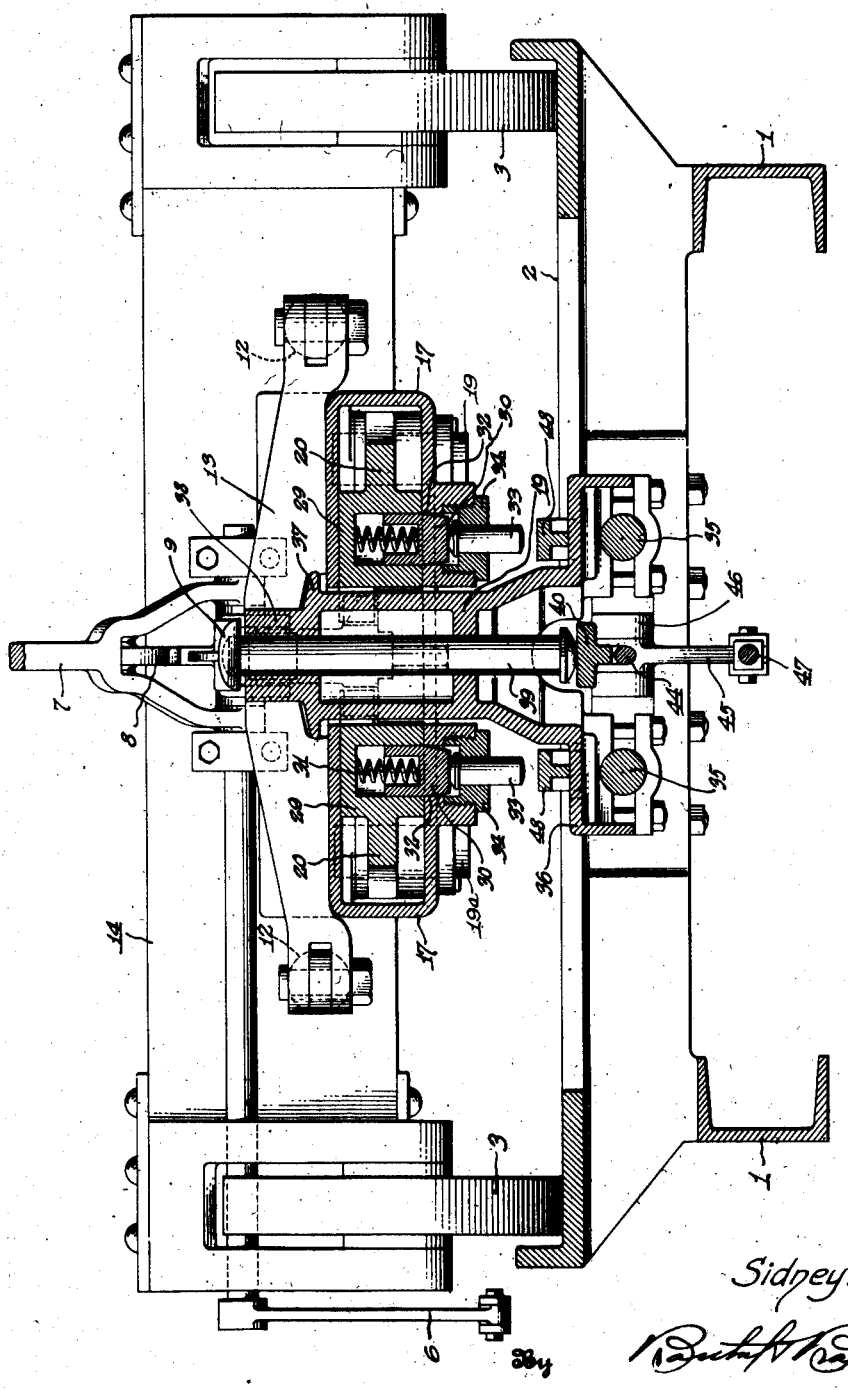

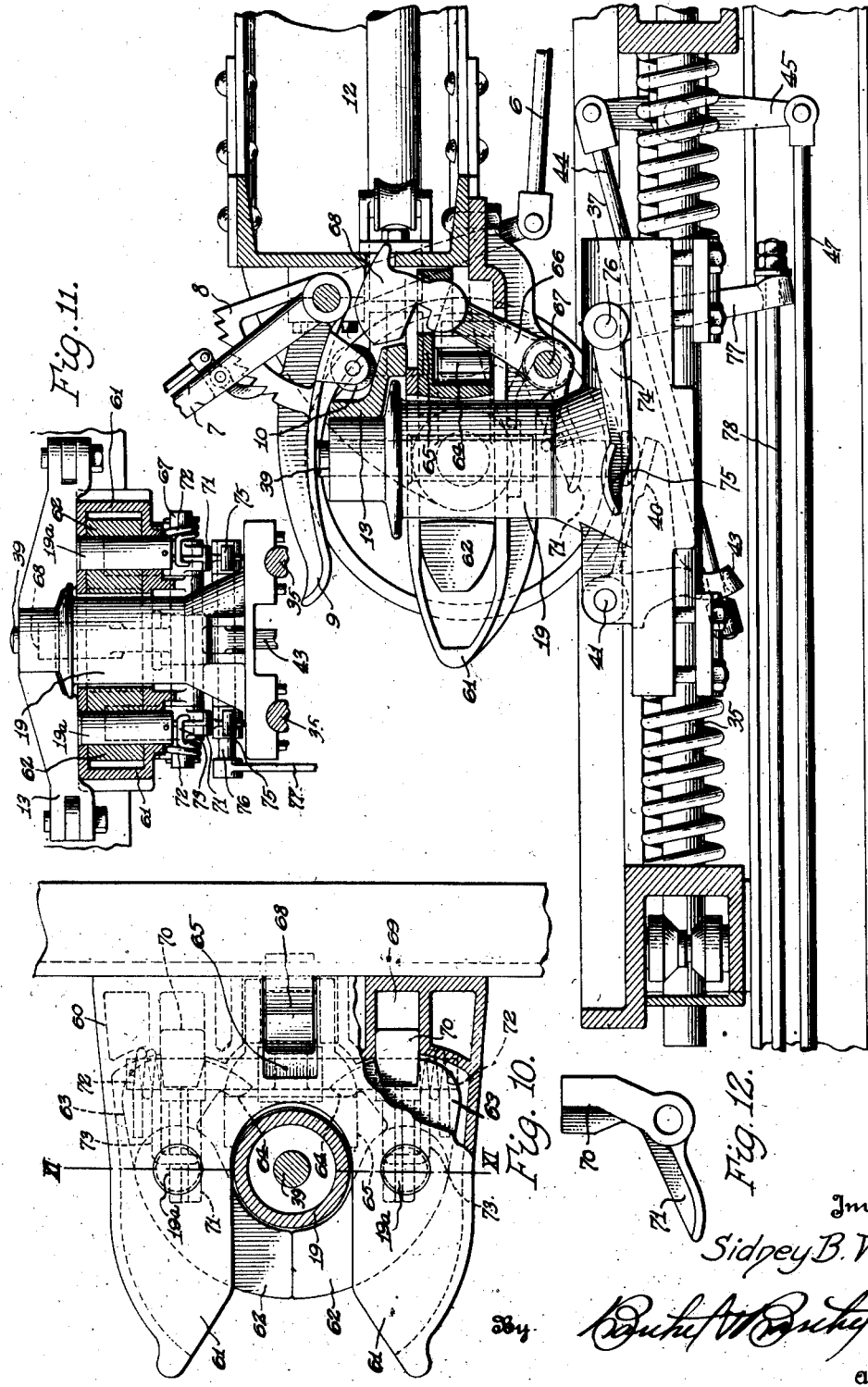

Patented Feb. 28, 1928.

1,660,946

UNITED STATES PATENT OFFICE.

SIDNEY B. WINN, OF LAPEER, MICHIGAN.

COUPLING.

Application filed March 13, 1926. Serial No. 94,406.

This invention relates to a tractor trailer combination wherein a tractor is detachably connected to a trailer and wherein the tractor and trailer are capable of independent use and may be briefly described as follows:

The trailer includes a chassis having a rear axle assembly provided with brakes adapted to be hand controlled from the forward end of the trailer; automatically controlled when the trailer attempts to push or crowd the tractor, and manually controlled from the tractor when the tractor trailer combination is operated as a unit. At the forward end of the trailer or in proximity thereto is a support adapted to be raised and lowered and when in a lowered active position adapted to support the forward end of the trailer independent of the tractor so that the trailer may be moved as a unit independent of the tractor. The trailer support is adapted to be raised to an inactive position when the tractor backs under the trailer and for this purpose the rear end of the tractor is equipped with a platform or turn-table adapted to receive wheels carried by the forward end of the trailer, said platform and wheels constituting a fifth wheel action for the tractor trailer combination.

The tractor includes, in addition to the platform previously mentioned, a draft appliance supporting a king pin, and operatable through the king pin is a tractor brake operating mechanism for controlling the trailer brakes.

In the type of tractor trailer combination outlined above a coupler is arranged between the tractor and trailer with the previously mentioned king pin forming one of the elements of the coupler, and this invention has special reference to a coupler that may be advantageously used in connection with the tractor trailer combination.

My invention aims to provide a coupler in which knuckles are arranged in jaws and adapted to embrace a tractor king pin. The enclosed knuckles are of such configuration and arrangement relative to the coupler jaws that either knuckle can be removed, and yet permit of a coupled relation being established between the tractor and trailer. This is essential because a knuckle may be broken or injured and should such happen the service condition of the tractor trailer combination is not materially interrupted, at least no danger of the trailer becoming accidentally detached from the tractor. The removal of an injured knuckle and the installation of a new knuckle may be easily and quickly accomplished without a shop operation of replacement.

My invention further aims to provide a coupler for a tractor trailer combination wherein coupler jaws have knuckles adapted to close about a king pin and become automatically locked in a closed position with the locking mechanism arranged to be manually released from the tractor, whereby the tractor may withdraw from the trailer. There are two forms of locking mechanism that I may use, and, if possible, I do not care to confine my invention to either or any other structural details, other than defined in the appended claims.

My improved coupler will be hereinafter described by aid of the drawings, wherein Figure 1 is a plan of the coupler in an open position and about to receive the king pin of a tractor backing under the forward end of a trailer;

Fig. 2 is a longitudinal sectional view of the same;

Fig. 3 is a plan of a portion of the tractor trailer combination in a coupled relation;

Fig. 4 is a longitudinal sectional view of the same;

Fig. 5 is a horizontal sectional view of a detached coupler head;

Fig. 6 is a cross sectional view taken on the line VI—VI of Fig. 4;

Fig. 7 is a cross sectional view taken on the line VII—VII of Fig. 3;

Fig. 8 is a diagrammatic elevation of a tractor trailer combination provided with a coupler in accordance with this invention;

Fig. 9 is a view similar to Fig. 4 showing another form of knuckle locking mechanism;

Fig. 10 is a plan of the coupler head, partly broken away and partly in section;

Fig. 11 is a cross sectional view of the same taken on the line XI—XI of Fig. 10, and Fig. 12 is a perspective view of a detached locking member of the form shown in Figs. 9 and 10.

In order that the relation of the principal parts of the tractor trailer combination may be understood, I have shown in Fig. 8 a tractor 1 having a platform or turn-table 2 for the wheels 3 at the forward end of the trailer 4. The trailer 4 has the usual rear axle assembly or truck 5 provided with a brake mechanism 6 which may be controlled from the forward end of the trailer by a hand lever mechanism 7 including a pivoted sector 8, a brake pin engaging shoe 9, and a brake setting roller 10. See Fig. 4. The trailer brake mechanism, as set forth in the beginning may be controlled from the tractor or automatically actuated as will hereinafter appear. The trailer 4 has a shiftable support 11 and extending forwardly from said support are support shifting members 12 normally protruding from the forward end of the trailer and connected by a cross head 13. See Fig. 1. It is believed that this outline of the tractor trailer combination is sufficient for an understanding of my improved coupler, and reference will now be had to the trailer equipment or coupler head.

Suitably fixed to the front sill 14 of the trailer 4 is the underlying flange 15 of a coupler head 16 provided with opposed hollow horizontally disposed jaws 17 which cooperate in forming a king pin opening 18 adapted to receive a king pin 19 yieldably supported by the tractor 1. The confronting faces of the jaws 17 are open and pivotally and detachably mounted in said hollow jaws, by pivot pins 19ᵃ, are opposed knuckles 20 adapted to embrace the king pin 19 and cooperate with top and bottom walls of the coupler head 16 in establishing a coupled relation between the head and king pin.

Detachably mounted in the inner end of the coupling head 16 is a bearing 21 and slidably mounted on this bearing, with a tongue and groove connection 22, is a knuckle actuating member 23. The outer end of this knuckle actuating member has a concave seat 24 to receive the king pin 19 and the side walls of said knuckle actuating member have recesses 25 to receive knuckle arms 26. It is by virtue of this knuckle actuating member 23 that the knuckles 20 may be moved in synchronism to a closed position by the king pin 19 pushing the knuckle actuating member 23 rearwardly.

On the top of the knuckle actuating member 23 and extending through a slot 27 of the coupler head 16 is a brake setting member 28 having a forward beveled end so that it may readily ride under the brake setting roller 10 and cause the trailer brakes to be applied for holding the trailer, when independent of the tractor and when the tractor is withdrawing from the trailer. This brake setting member 28 has a defined relation to the cross head 13 so that when the tractor and trailer are coupled as shown in Fig. 4, the brake setting roller 10 may rest on the cross head 13 in front of the brake setting member 28 with neither the cross head nor the brake setting member interfering with movement of the brake setting shoe 9, as will hereinafter appear.

The coupler knuckles 20 are provided with housing 29 for knuckle locking members 30 which are normally spring pressed by compression springs 31 arranged in the housing 20 and seated in the knuckle locking members 30. These knuckle locking members have lower beveled ends adapted to extend through openings 32 in the bottom walls of the jaws 17. Adapted to engage the lower ends of the knuckle locking members 30 are headed pins 33 carried by holders 34 mounted in the bottom walls of the jaws 17, said pins depending from the holders 34 and during a coupled relation of the tractor trailer at opposite sides of the king pin 19, as best shown in Fig. 7.

Reference will now be had to the tractor equipment of which the king pin 19 forms an important part. On the tractor is a conventional form of draft appliance 35 including a base 36 for the king pin 19 which is hollow and provided with a horizontal peripheral flange or head 37 and an abutment 38. The flange or head 37 is adapted to extend over the upper walls of the jaws 17 and prevent vertical displacement of the coupler head during a coupled relation of said head with the king pin 19. The abutment 39 above the head 37 is brought into action when the tractor backs into engagement with the trailer, said abutment engaging the cross head 13, as best shown in Fig. 2, to push said cross head rearwardly and cause elevation of the trailer support 11 to an inactive position.

Slidably mounted in the hollow king pin 19 and protruding from the upper end thereof for engagement with the brake setting shoe 9 is a vertically disposed brake pin 39 having its lower end resting on a bell crank 40 loosely mounted on a rock shaft 41, journaled in bearings 42, carried by the base 36 of the king pin 19. The bell crank 40 has a loose connection 43 with a rearwardly extending rod 44 pivotally connected to the upper end of a double crank 45 pivotally mounted in a bracket 46 supported from a portion of the platform 2. The lower end of the double crank 45 is pivotally connected to a forwardly extending reach rod 47 that may be controlled by a driver of the tractor 1.

Mounted on the rock shaft 41 are rearwardly extending cranks or shoes 48 arranged at the sides of the king pin 19 and adapted to engage and elevate the pins 33 for unlocking the jaw knuckles 20. On one end of the rock shaft 41 is a crank 49 operatively connected by a link 50 to a bell crank 51 supported from a portion of the platform 2 and said bell crank is pivotally connected to a forwardly extending rod 52 that may be controlled by the driver of the tractor.

I will now describe various operating conditions of the tractor trailer combination and first assume that the tractor is backing into engagement with the trailer 4 which has its brakes applied by the brake setting member 28 engaging under the brake setting roller 10, as best shown in Fig. 2. As the king pin 19 approaches the coupler head 16, the abutment 38 encounters the cross head 13 and pushes said cross head rearwardly to elevate the support 11. This is accomplished while the trailer brakes are set. As the king pin 19 enters the opening 18 of the coupler head 16 it encounters the knuckle actuating member 23 and two functions are attributed to this member as it is pushed rearwardly to the position shown in Fig. 4. The knuckles 20, which are open and have their locking members 30 resting on the bottom walls of the jaws 17, are swung to a closed position through the medium of the knuckle arms 26 and when the forward ends of the knuckles contact, as shown in Fig. 3, the locking members 30 are forced into the openings 32 of the jaw walls and engage the pins 33 of the holders 34. The knuckles 20 are therefore locked about the king pin 19, as best shown in Figs. 3 and 7. Rearward movement of the knuckle actuating member 23 has carried the brake setting member 28 rearwardly from under the brake setting roller 10 thus lowering the shoe 9 into engagement with the upper end of the brake pin 39. The tractor and trailer are now coupled for combined service and it is during such service that the following may take place.

If the brakes of the trailer are to be controlled from the tractor, the driver of the tractor may shift the rod 47, rock the cranks 45 and 40, raise the brake pin 39 and the shoe 9, and cause the brakes of the trailer to be applied.

If the brakes of the trailer are to be controlled by hand from the trailer, this may be accomplished by the hand lever 7 which is operatable independent of the brake pin 39.

If the trailer attempts to overrun or crowd the tractor, the base 37 of the king pin 19 is pushed forwardly and since the rods 44 and 47 are held by the tractor, the rock shaft 41 becomes a pivot for the bell crank 40, which having one end thereof held by the rod 44 causes the bell crank 40 to raise the brake pin 39 and the shoe 9 and apply the trailer brakes.

To uncouple the tractor from the trailer so that the tractor may withdraw from the trailer, it is necessary that the driver of the tractor pull upon the rod 52 which causes the shaft 41 to be rocked and the cranks or shoes 48 swung upwardly to elevate the pins 33 and the knuckle unlocking members 30. As these knuckle unlocking members 30 have the lower ends thereof raised, to the plane of the bottom walls of the jaws 17, the tractor can be pulled away from the trailer with the king pin 19 swinging the knuckles 20 to open positions as shown in Fig. 5. Obviously the lower jaw walls support the knuckle locking members 30 with the springs 31 under compression. Opening of the knuckles 20 causes the arms 26 thereof to shift the knuckle actuating member 23 and the brake setting member 28 forwardly, whereby the brake setting member 28 is placed under the roller 10 and the trailer brakes are set. The trailer support 11 descending by gravity or otherwise, causes the cross head 13 to follow the abutment 38 until the support is in an active trailer supporting position at which time the abutment 38 leaves the cross head 13 by the tractor moving forward. The trailer is now independent of the tractor, with its brakes set so that the trailer cannot accidentally move or follow the tractor. To move the trailer about it is only necessary to release the brakes by the hand lever 7, and with the trailer brakes set the parts at the forward end of the trailer are in condition for actuation by tractor parts when backed into engagement with the trailer parts.

Reference will now be had to Figs. 9 to 12 inclusive wherein I disclose another form of coupler and particularly another form of lock mechanism for the coupler knuckles. The coupler head is generally designated 60 and has hollow confronting jaws 61 for laterally swingable pivoted opposed knuckles 62 having notched keeper portions 63 and side arms 64. The side arms 64 extend into a knuckle actuating member 65 somewhat similar to the member 23 with the exception that the knuckle actuating member 65 has its inner end slotted to provide clearance for an arm 66 loosely mounted on the transverse shaft 67 supported by the coupler head 60. The upper end of the arm 66 has a brake setting member 68 serving the same purpose as the member 28. The brake setting member 68 has a configuration by which it may be easily actuated by the knuckle actuating member 65.

The coupler head 60 is slotted to provide clearance for the arm 66 and is furthermore slotted, as at 69 to provide clearance for pivoted vertically disposed locking members 70 which are swingable into and out of engagement with the notched keeper portions 63 of the knuckles 62. See Fig. 10. These swingable locking members are loose on the ends of the shaft 67 and said locking members have a bell crank formation to provide shoes 71 that extend forwardly at the sides of the king pin 19.

Mounted on the ends of the shaft 67 are coiled springs 72 having ends 73 thereof engaging the shoes 71 and other ends engaging the coupler head with said springs constantly stressed so that the shoes 71 will be depressed and a locking member 70 held in the keeper portions 63 of the knuckles 62 when said knuckles are closed, as shown in Fig. 10, or held against the keeper portions 63 when the knuckles 62 are open, whereby the locking members 70 may snap into the keeper portion 63 as soon as the knuckles 62 are closed.

In order that the shoes 71 may be raised to retract the locking members 70 and release the knuckles 62 for an opening movement, there are cranks 74, shoes 75, a rock shaft 76, a crank 77 and a forwardly extending reach rod 78 operatable from the tractor. These elements 75 to 78 inclusive answer the same purpose as the elements 48 to 52 shown in Fig. 4 and previously described.

It is thought that the operation of the locking mechanism for the knuckles of the coupler head 60 will be apparent without further description in view of by explanation of the operations in connection with the coupler head 16, and in view of my former Patents Nos. 1,548,968; 1,548,967, and 1,548,966, all under date of Aug. 11, 1925, it will be found that this invention particularly resides in the coupler which has been especially designed for my tractor trailer combination possessing the characteristics set forth in the beginning.

What I claim is:—

1. In a tractor trailer combination wherein the rear end of a tractor is adapted to be backed under the forward end of a trailer and coupled thereto, a coupler for connecting said tractor and trailer, said coupler comprising a tractor king pin, a trailer head adapted to receive said king pin, knuckles pivoted in said head and adapted to embrace said king pin, reciprocating means having articulated engagement with said knuckles and movable by said king pin in one direction of means reciprocation for closing said knuckles about said king pin, said means being movable in the opposite direction by knuckle movement, and means in said head adapted for locking said knuckles in a closed position.

2. In a tractor trailer combination wherein the rear end of a tractor is adapted to be backed under the forward end of a trailer and coupled thereto, a coupler for connecting said tractor and trailer, said coupler comprising a tractor king pin, a trailer head adapted to receive said king pin, knuckles in said head adapted to embrace said king pin, means engaging said knuckles and operatable by said king pin adapted for closing said knuckles about said king pin, and spring pressed locking members held retracted in said head by an open position of said knuckles and adapted to be automatically released when said knuckles are closed to lock said knuckles about said king pin.

3. Tractor trailer coupling means as called for in claim 2 and means carried by said tractor adapted to be manually operated to actuate said locking members and permit of said king pin opening said knuckles when said tractor withdraws from said trailer.

4. In tractor trailer combination wherein the rear end of a tractor is adapted to be backed under the forward end of a trailer and coupled thereto, a coupler for connecting said tractor and trailer, said coupler comprising a tractor king pin, a trailer head, jaws carried by said head and between which jaws said king pin is adapted to be placed, knuckles in said jaws adapted to cooperate with said head in coupling said king pin to said head, and releasable locking means in said jaws bearing against said knuckles when in open positions, said means being releasable by said knuckles moving to a closed position in engagement with said king pin to lock said knuckles in a closed position.

5. Tractor trailer coupling means as called for in claim 4, and means carried by said tractor adapted to be manually operated to actuate said locking members and permit of said king pin opening said knuckles when said tractor withdraws from said trailer.

6. A tractor trailer coupler comprising a trailer head, a tractor pin, hollow opposed jaws carried by said head and between which jaws said tractor pin is placed, pin engaging knuckles in said jaws, means slidable in said head engageable by said pin adapted for closing said knuckles relative to said pin, and means in said jaws adapted to engage in said knuckles for locking said knuckles in closed positions.

7. A tractor trailer coupler comprising a trailer head, a tractor pin, hollow opposed jaws carried by said head and between which jaws said tractor pin is placed, pin engaging knuckles in said jaws, means slidable in said head engageable by said pin adapted for closing said knuckles relative to said pin, and locking members in said jaws held retracted by said knuckles when said knuckles are open and adapted to be released by said knuckles when said knuckles are closed to engage in said knuckles and lock said knuckles in a closed position, 8. A tractor trailer coupler as called for in claim 7, and tractor means adjacent said pin adapted to actuate said locking members to retract said locking members to release said knuckles.

9. In a tractor trailer combination wherein a tractor is adapted to have its rear end backed under the forward end of the trailer and coupled thereto, and wherein the tractor includes a king pin;—means on the forward end of the trailer for engagement with the tractor pin to operatively couple the tractor and trailer, said means comprising a set of jaws adapted to guide the tractor pin to a coupling position, knuckles pivoted in said jaws and adapted to be opened and closed by engagement and disengagement of said tractor relative to said trailer, knuckle holding means for said knuckles when closed about the tractor pin, and means operatable from the tractor adapted to release said knuckle holding means and permit of said knuckles being opened.

10. A tractor trailer combination as called for in claim 9, further characterized by said trailer having a brake mechanism, and means between said knuckles adapted to actuate said brake mechanism and set the brakes of the trailer when said knuckles are opened.

11. A tractor trailer combination as called for in claim 9, wherein said knuckle holding means includes spring pressed locking members in said jaws and adapted to enter said knuckles when said knuckles are placed in a closed position relative to said tractor pin.

12. A tractor trailer coupler comprising a tractor pin, a trailer head, opposed hollow jaws carried by said head and affording an entrance opening for said pin, said pin and jaws being proportioned so that said pin may engage either jaw, a knuckle in each jaw adapted to engage said pin, either knuckle being adapted for retaining said pin between said jaws, and knuckle locking means carried by said head.

13. A tractor trailer coupler as called for in claim 12, wherein said knuckle locking means includes a locking member in each jaw adapted to engage in a knuckle wall.

14. A tractor trailer coupler comprising a tractor pin, a trailer head, opposed hollow jaws carried by said head and affording an entrance opening for said pin, said pin and jaws being proportioned so that said pin may engage either jaw, a knuckle in each jaw adapted to engage said pin, either knuckle being adapted for retaining said pin between said jaws, a locking member for each knuckle adapted to engage in a knuckle wall and secure the knuckle in a closed position, and means adapted to engage said locking member and shift it so that said knuckle may swing to an open position.

15. In a tractor trailer combination, a trailer having brakes applied for tractor coupling purposes, a tractor, a pin carried thereby and adapted for releasing the trailer brakes, a coupler head on said trailer adapted to receive said tractor pin, and opposed knuckles in said coupler head adapted to engage said tractor pin, either knuckle cooperating with said coupler head in holding said tractor pin, and knuckle locking means in said coupler head.

16. A tractor trailer combination as called for in claim 15, and means operatable from said tractor adapted for actuating said knuckle locking means.

17. A tractor trailer combination as called for in claim 15, and a knuckle actuating member connecting said knuckles for moving said knuckles, said knuckle actuating member being operatable by said tractor pin for releasing said trailer brakes.

18. In a tractor trailing coupling wherein a coupler head is adapted to receive a coupler pin;—pivoted knuckles in said head, and a member directly engaging said knuckles and movable reciprocatingly in said head in one direction reciprocation by said coupler pin to close said knuckles about said coupler pin said knuckles and member being relatively formed and positioned whereby either knuckle is to cooperate with said head in holding said pin during service activity independent of the other knuckle to maintain service activity in presence of disabling of either knuckle.

19. A tractor trailer coupling as called for in claim 18, further characterized by spring pressed means individual to each knuckle in said head adapted to engage in said knuckles to retain said knuckles in engagement with said coupling pin.

20. In a tractor trailer coupling wherein a coupler head is adapted to receive a coupler pin, and wherein the trailer has a brake mechanism;—knuckles in said head adapted to be swung to an open position by said coupler pin, a member in said head operatable by said coupler pin adapted to close said knuckles about said coupler pin, and a pivoted member supported by said head and adapted to be actuated by said member to apply the trailer brakes when said knuckles are opened by said coupler pin.

21. A tractor trailer combination wherein a trailer has a brake mechanism, a coupling mechanism for the tractor and trailer, said coupling mechanism including laterally swingable knuckles adapted to embrace said coupler member, an interposed member adapted to cause said knuckles to move in synchronism, and another member operatable by said interposed member for setting the trailer brake mechanism.

22. In a tractor-trailer combination adapted to be coupled and uncoupled by relative movement of tractor and trailer in the direction of traction, a coupling instrumentality adapted to be rendered active automatically and be rendered inactive at will, said instrumentality including a coupler member, knuckles adapted to engage and disengage such member, means operatively engaging the knuckles to move the latter by member movements in coupling and be moved by the knuckles for member disengaging activity in uncoupling, and movable mechanism independent of such means for maintaining the knuckles in member-engaging position, said mechanism being operative to maintain coupled service activity in presence of disablement of either knuckle, said mechanism being adapted to be rendered inactive at will.

23. A coupling instrumentality as in claim 22 characterized in that the means is in the form of a reciprocating element movable in the direction of coupling and uncoupling movement and having articulated engagement with both knuckles.

24. A coupling instrumentality as in claim 22 characterized in that the mechanism is in the form of latch mechanisms individual to the knuckles and adapted to be rendered active automatically and inactive at will.

In testimony whereof I affix my signature.

SIDNEY B. WINN.